United States Patent
Lim et al.

(10) Patent No.: US 11,742,880 B2
(45) Date of Patent: Aug. 29, 2023

(54) RADIO FREQUENCY SWITCH SYSTEM, RADIO FREQUENCY SWITCH PROTECTIVE CIRCUIT, AND PROTECTING METHOD THEREOF

(71) Applicant: Samsung Electro-Mechanics Co., Ltd., Suwon-si (KR)

(72) Inventors: Jongmo Lim, Suwon-si (KR); Wonsun Hwang, Suwon-si (KR); Byeonghak Jo, Suwon-si (KR); Yoosam Na, Suwon-si (KR); Youngsik Hur, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 36 days.

(21) Appl. No.: 17/075,756

(22) Filed: Oct. 21, 2020

(65) Prior Publication Data

US 2022/0038119 A1 Feb. 3, 2022

(30) Foreign Application Priority Data

Jul. 31, 2020 (KR) .................. 10-2020-0096227

(51) Int. Cl.
*H04B 1/00* (2006.01)
*H04B 1/04* (2006.01)
*H04B 1/3888* (2015.01)

(52) U.S. Cl.
CPC .............. *H04B 1/006* (2013.01); *H04B 1/04* (2013.01); *H04B 1/3888* (2013.01)

(58) Field of Classification Search
CPC ........ H04B 1/0053; H04B 1/006; H04B 1/04; H04B 1/3888

USPC ........ 375/295–299; 327/404, 405, 416, 417; 333/32, 262, 263; 455/107, 114.3, 121, 455/127.1, 129

See application file for complete search history.

(56) References Cited

U.S. PATENT DOCUMENTS

| | | | |
|---|---|---|---|
| 7,663,398 B1 | 2/2010 | Lee et al. | |
| 9,209,854 B2 | 12/2015 | Kim et al. | |
| 10,498,327 B2 | 12/2019 | Bolton et al. | |
| 10,756,573 B2* | 8/2020 | Liao | H02J 50/20 |
| 2012/0214422 A1* | 8/2012 | Shi | H04B 1/3838 455/67.11 |
| 2013/0009725 A1* | 1/2013 | Heaney | H01L 27/1203 257/E21.317 |
| 2016/0241234 A1* | 8/2016 | Mavretic | G01R 19/165 |
| 2019/0108977 A1* | 4/2019 | Wei | H01L 21/67011 |
| 2020/0014381 A1* | 1/2020 | Zhu | H01L 27/1203 |

FOREIGN PATENT DOCUMENTS

| | | | | |
|---|---|---|---|---|
| EP | 2148442 A1 * | 1/2010 | | H01H 11/00 |
| KR | 10-1952855 B1 | 2/2019 | | |

* cited by examiner

*Primary Examiner* — Young T. Tse
(74) *Attorney, Agent, or Firm* — NSIP Law

(57) ABSTRACT

A radio frequency (RF) switch system, an RF switch protective circuit, and a protecting method thereof are provided. The RF switch system may include an RF switch and a protective circuit. The RF switch may be connected between a port that receives an RF signal and a ground. The protective circuit may detect a first voltage that is a voltage that is generated when the first RF switch is turned off, and may transmit an impedance value that is varied based on the first voltage to the port.

22 Claims, 11 Drawing Sheets

RADIO FREQUENCY SWITCH SYSTEM, RADIO FREQUENCY SWITCH PROTECTIVE CIRCUIT, AND PROTECTING METHOD THEREOF

CROSS-REFERENCE TO RELATED APPLICATIONS APPLICATION

This application claims the benefit under 35 USC 119(a) of Korean Patent Application No. 10-2020-0096227 filed on Jul. 31, 2020, in the Korean Intellectual Property Office, the entire disclosure of which is incorporated herein by reference for all purposes.

BACKGROUND

1. Field

The following description relates to a radio frequency switch system, a radio frequency switch protective circuit, and a protecting method thereof.

2. Description of Related Art

A radio frequency (RF) switch is an element that is generally used in a transmitting end and a receiving end of a communication module, and functions to allow an RF signal to pass through, or to bypass the RF signal to a ground. The RF switch may also be used to vary a use frequency of an antenna, and the RF switch may be connected between the antenna and an impedance component to switch connection of the impedance component to the antenna.

A withstand voltage characteristic of withstanding high power of the RF signal is an important aspect in the RF switch. When the RF switch is turned off, a high voltage is applied, accordingly, linearity of the RF switch may be affected and the RF switch may be damaged. The voltage that the turned-off switch should withstand is limited, accordingly a method for connecting transistors at various stages in series is implemented by the RF switch to prevent the RF switch from breaking down. When the RF switch is realized by implementing the transistors at many stages in series, the voltage distributed to one transistor may be reduced to prevent the RF switch from breaking down.

The RF switch may be broken down when a high voltage is distributed to a specific stage from among the transistors at many stages. To solve this issue, many more transistors may be coupled in series. However, when many transistors are used, the characteristic of the On stage of the RF switch may deteriorate. To counter this, a total width of the transistors may be increased, which may, however, increase a size of an integrated circuit.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a radio frequency (RF) switch system includes a first RF switch connected between a port which receives an RF signal and a ground; and a protective circuit, configured to detect a first voltage that is generated when the first RF switch is turned off, and transmit an impedance value to the port, wherein the impedance value is varied based on the detected first voltage.

The protective circuit may be connected between the port and the ground.

The impedance value may have a lower value at a second voltage, and the first voltage may be higher than a third voltage.

The first RF switch may include at least one transistor, and the first voltage may be transmitted to at least one of a gate and a body of the transistor.

The RF switch system may further include a voltage generator, configured to generate the first voltage and transmit the generated first voltage to at least one of the gate and the body of the transistor, wherein the first voltage is a negative voltage.

The RF switch system may further include a second RF switch connected between the port and an antenna, and may be configured to switch transmission of the RF signal to the antenna, wherein the second RF switch may be configured to turn off when the first RF switch is turned on.

A first end of the first RF switch may be connected to the port, an impedance component may be connected between a second end of the first RF switch and the ground, and the first RF switch may be configured to transmit the impedance component to tune an antenna.

The first RF switch may include a second RF switch and a third RF switch, a first end of the second RF switch may be connected to the port, an impedance component may be connected between a second end of the second RF switch and the ground, the third RF switch may be connected between the second end of the second RF switch and the ground, and the first voltage is generated when at least one of the second RF switch and the third RF switch is turned off.

The protective circuit may include a voltage detector, configured to receive the first voltage, and generate a second voltage corresponding to the first voltage; and an impedance variation unit, configured to transmit an impedance value that may be varied by the second voltage to the port.

The impedance variation unit may include at least one transistor comprising a first end connected to the port; and an impedance component, connected between the at least one transistor and the ground, and an impedance value of the at least one transistor changes based on a control of the second voltage.

The impedance variation unit may further include a voltage limiter connected between the port and the at least one transistor.

The impedance variation unit may include a voltage limiter comprising a first end connected to the port; a variable capacitor including a first end connected to a second end of the voltage limiter; and an impedance component connected between a second end of the variable capacitor and the ground, and an impedance value of the variable capacitor is changed based on a control of the second voltage.

The impedance variation unit may further include a variable capacitor connected between the port and a first end of the at least one transistor, and an impedance value of the variable capacitor is changed based on a control of the second voltage.

In a general aspect, a radio frequency (RF) switch protective circuit that protects an RF switch connected between a port that receives an RF signal includes a voltage detector, configured to detect a first voltage transmitted to the RF switch to turn off the RF switch; and an impedance variation unit, configured to transmit an impedance value that is varied by the first voltage between the port and the ground.

The impedance value may have a lower value when the first voltage becomes high.

The RF switch may include a plurality of transistors, the first voltage may be applied to bodies of the plurality of transistors, the first voltage may be predetermined with a negative voltage, and when a voltage at respective ends of the RF switch increases, the first voltage rises to a level that may be higher than the negative voltage.

The impedance variation unit may include at least one of a transistor with an impedance value that is varied based on the first voltage and a variable capacitor.

The impedance variation unit may further include a voltage limiter comprising at least one diode and is connected between the port and at least one element.

In a general aspect, a method to protect a radio frequency (RF) switch connected between a port that receives an RF signal and a ground includes detecting a first voltage applied to the RF switch to turn off the RF switch; transmitting a first impedance value between the port and the ground when the first voltage corresponds to a second voltage; and transmitting a second impedance value that is lower than the first impedance value between the port and the ground when the first voltage is a third voltage that is higher than the second voltage.

The second voltage may be a negative voltage, and the first voltage may rise to the third voltage when a voltage at respective ends of the RF switch increases.

Other features and aspects will be apparent from the following detailed description, the drawings, and the claims

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
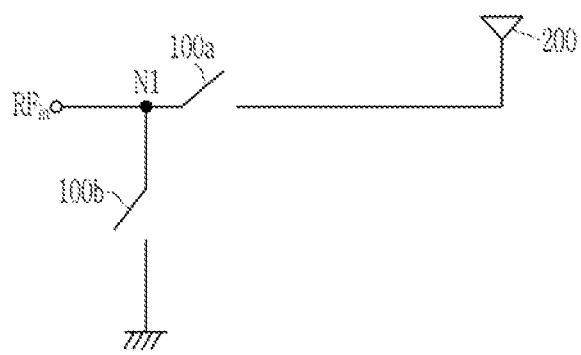
FIG. 1 illustrates an example RF switch, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms, "includes," "comprises," "is configured to," "has," etc. of the description specify the presence of stated features, numbers, steps, operations, members, elements, parts, and/or combinations thereof, but do not preclude the presence or addition of one or more other features, numbers, steps, operations, members, elements, parts, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Due to manufacturing techniques and/or tolerances, variations of the shapes shown in the drawings may occur. Thus, the examples described herein are not limited to the specific shapes shown in the drawings, but include changes in shape that occur during manufacturing.

Throughout the specification, the RF signal may have a format according to other random wireless and wired protocols designated by Wi-Fi (IEEE 802.11 family, etc.), WiMAX (IEEE 802.16 family, etc.), IEEE 802.20, LTE (long term evolution), Ev-DO, HSPA+, HSDPA+, HSUPA+, EDGE, GSM, GPS, GPRS, CDMA, TDMA, DECT, Bluetooth, 3G, 4G, 5G, and subsequent ones.

FIG. 1 illustrates an example RF switch, in accordance with one or more embodiments.

Referring to FIG. 1, the RF switch 100a may be positioned in an RF signal line to transmit RF signals to an antenna 200. The RF switch 100a may be connected between a terminal (RFin) which receives the RF signal, and the antenna 200, and may switch transmission of the RF signal between the terminal (RFin), which receives the RF signal, and the antenna 200.

An RF switch 100b may be connected between the terminal (RFin), which receives the RF signal, and a ground so as to allow the RF signal to be bypassed to the ground. The RF switch 100b may allow the RF signal to be bypassed to the ground when it is turned on. In an example, when the RF switch 100a is turned off, the RF switch 100b may be turned on to allow the RF signal to be bypassed to the ground. When the RF switch 100a is turned on, the RF switch 100b may be turned off, and the RF signal may be transmitted to the antenna 200. A node at which the RF switch 100a contacts the RF switch 100b is marked as N1 in FIG. 1, and, in an example, the node N1 may be the terminal (RFin) which receives the RF signal.

Figure 2:
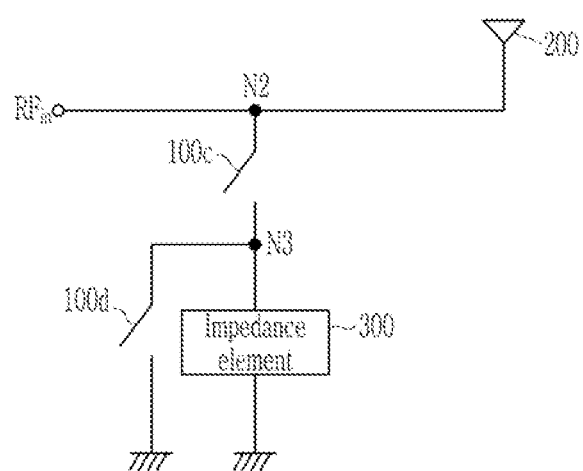
FIG. 2 illustrates an example RF switch, in accordance with one or more embodiments.

FIG. 2 illustrates an example RF switch, in accordance with one or more embodiments.

Referring to FIG. 2, an RF switch 100c may be connected between the antenna 200 and an impedance component 300 to vary an impedance of the antenna 200. That is, a first end of the RF switch 100c may be connected to the terminal (RFin), which receives the RF signal, and the antenna 200, and the impedance component 300 may be connected between a second end of the RF switch 100c and the ground. The impedance component 300 may include, as non-limiting examples, at least one of a resistor, a capacitor, and an inductor. When the RF switch 100c is turned on, the impedance of the antenna 200 may be changed by the impedance component 300. Accordingly, the antenna 200 may support various frequency bands. That is, depending on whether the RF switch 100c is turned on or turned off, the frequency bands supportable by the antenna 200 may be changed.

Referring to FIG. 2, an RF switch 100d may be positioned between the second end of the RF switch 100c and the ground. When the RF switch 100c is turned on, the RF switch 100d may be turned off, and when the RF switch 100c is turned off, the RF switch 100d may be turned on. Specifically, the antenna 200 may be tuned by alternately switching the RF switch 100c and the RF switch 100d. In FIG. 2, a node at which the RF switch 100c contacts the antenna 200 is marked as N2, and a node at which the RF switch 100c contacts the RF switch 100d is marked as N3.

For better understanding and ease of description, one RF switch 100c, one RF switch 100d, and one impedance component 300 are provided in FIG. 2. However, the number of the RF switches 100c and 100d and the impedance component 300 may be plural in number so as to support various frequency bands.

From among the switches described with reference to FIG. 1 and FIG. 2, the switch connected between a predetermined port (i.e., terminal (RFin)) and the ground may receive a high voltage of the RF signal when it is turned off, so a breakdown of the switch may occur. That is, the RF switch 100b, the RF switch 100c, and the RF switch 100d may be respectively connected between the predetermined port and the ground, and when they are turned off, a high voltage of the RF signal may be applied, so a function for protecting he RF switch 100b, the RF switch 100c, and the RF switch 100d may be beneficial. The RF switch 100b, the RF switch 100c, and the RF switch 100d may receive a further higher voltage by a voltage standing wave ratio (VSWR) as well as the voltage caused by the RF signal. The antenna impedance of the antenna 200 may vary by 50 ohms according to various use conditions, by which the voltage standing wave ratio (VSWR) increases. By a reflected wave generated in a high voltage standing wave ratio (VSWR) condition, a higher voltage may be applied to the turned-off RF switch 100b, the RF switch 100c, and the RF switch 100d, by which a of the switch may occur. A circuit for protecting the switch from such a breakdown and an RF switch system including the same will now be described.

Figure 3:
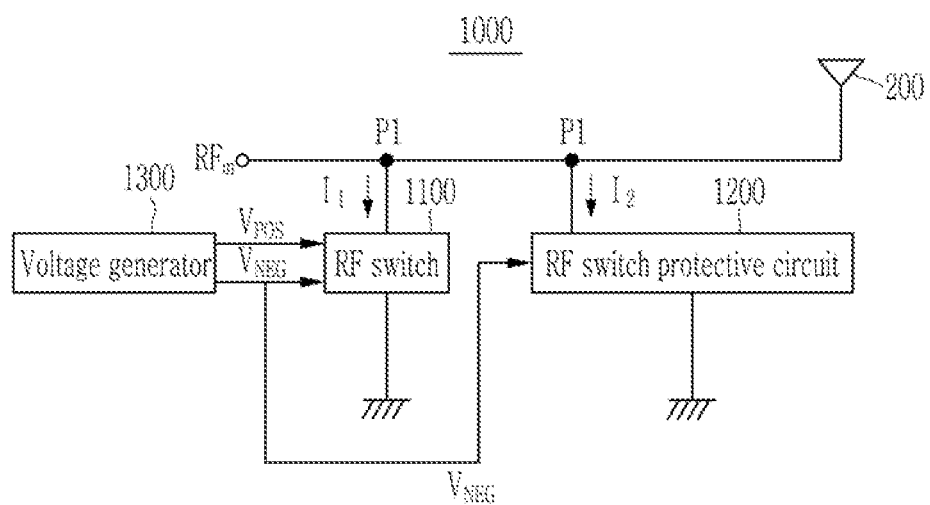
FIG. 3 illustrates an example RF switch system, in accordance with one or more embodiments.

FIG. 3 illustrates an RF switch system 1000, in accordance with one or more embodiments.

Referring to FIG. 3, the RF switch system 1000 may include an RF switch 1100, a an RF switch protective circuit 1200, and a voltage generator 1300.

The RF switch 1100 may be connected between a predetermined port P1 and a ground. In an example, the RF switch 1100 may be one of the RF switch 100b, the RF switch 100c, and the RF switch 100d described with reference to FIG. 1 and FIG. 2. Referring to FIG. 3, a predetermined port P1 may be one of the nodes N1, N2, and N3 described with reference to FIG. 1 and FIG. 2, and may be an RF common port in the RF circuit. The RF switch 1100 receives a turn-on voltage or a turn-off voltage from the voltage generator 1300, and is switched on or off.

The voltage generator 1300 generates the turn-on voltage and the turn-off voltage of the RF switch 1100, and supplies the generated turn-on voltage and turn-off voltage to the RF switch 1100. Referring to FIG. 3, a turn-on voltage of the RF switch 1100 is shown as $V_{POS}$, and a turn-off voltage of the RF switch 1100 is shown as $V_{NEG}$. The turn-on voltage ($V_{POS}$) may be a positive (+) voltage, and the turn-off voltage ($V_{NEG}$) may be a negative (−) voltage. In an example, the voltage generator 1300 may be implemented with a charge pump to supply the turn-off voltage ($V_{NEG}$) to the RF switch 1100. A method for the voltage generator 1300 to generate the turn-on voltage ($V_{POS}$) and the turn-off voltage ($V_{NEG}$) will not be described herein.

Figure 4:
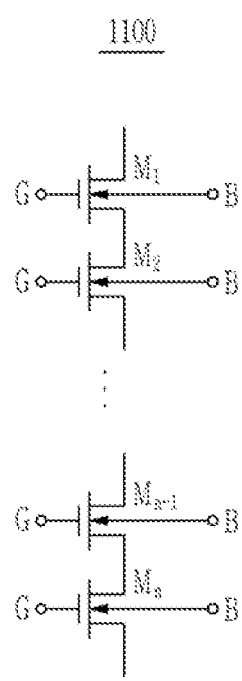
FIG. 4 illustrates an example RF switch of FIG. 3.

FIG. 4 illustrates an example RF switch 1100 of FIG. 3.

Referring to FIG. 4, the RF switch 1100, in accordance with one or more embodiments, may include a plurality of transistors ($M_1, M_2, \ldots, M_{n-1}, M_n$), and the transistors ($M_1, M_2, \ldots, M_{n+1}, M_n$) may be coupled in series with each other. That is, the RF switch 1100 has a structure in which a plurality of transistors ($M_1, M_2, \ldots, M_{n-1}, M_n$) are stacked. A drain of the transistor $M_1$ may be connected to a port P1, a drain of the transistor $M_2$ may be connected to a source of the transistor M1, and a drain of the transistor ($M_n$) may be connected to a source of the transistor $M_{n-1}$. Here, a plurality of transistors ($M_1, M_2, \ldots, M_{n-1}, M_n$) may be a FET (Field Effect Transistor), a MOSFET (Metal Oxide Semiconductor Field Effect Transistor), or a BJT (Bipolar Junction Transistor).

The turn-on voltage ($V_{POS}$) or the turn-off voltage ($V_{NEG}$) may be applied to gates (G) of a plurality of transistors ($M_1, M_2, \ldots, M_{n-1}, M_n$)

When the turn-on voltage ($V_{POS}$) is applied to the gate (G), a plurality of transistors ($M_1, M_2, \ldots, M_{n-1}, M_n$) are turned on, and when the turn-off voltage ($V_{NEG}$) is applied to the gates (G), a plurality of transistors ($M_1, M_2, \ldots, M_{n-1}, M_n$) are turned off. When the switch 1100 is turned off, the turn-off voltage ($V_{NEG}$) is applied to bodies (B) of a plurality of transistors ($M_1, M_2, \ldots, M_{n-1}, M_n$).

When the switch 1100 is turned off and a high voltage is applied to respective ends of the switch 1100, the turn-off voltage ($V_{NEG}$) supplied by the voltage generator 1300 may become greater than a predetermined value. That is, the turn-off voltage ($V_{NEG}$), that is a negative (—) voltage, becomes greater than the predetermined value. When the switch 1100 is turned off, a potential difference between the drain and the source of each of a plurality of transistors ($M_1, M_2, \ldots, M_{n-1}, M_n$) increases. When the potential of the drain increases, a high leakage current flows to the body, and a leakage current that is greater than the current driven by the voltage generator 1300 that supplies a negative turn-off voltage ($V_{NEG}$) supplied to the body (B) and the gate (G), is generated. Accordingly, the negative turn-off voltage ($V_{NEG}$) supplied by the voltage generator 1300 becomes greater than a predetermined value. In an example, when the turn-off voltage ($V_{NEG}$) is set to be −5 V, the turn-off voltage ($V_{NEG}$) may increase to approximately the level of 0 V. This phenomenon will be referred to as a gate induced drain leakage (GIDL). When the negative turn-off voltage ($V_{NEG}$) is applied to the gates (G) and the bodies (B) of a plurality of transistors ($M_1, M_2, \ldots, M_{n-1}, M_n$), depletion regions may be formed in sections where the gates and the drains of a plurality of transistors ($M_1, M_2, \ldots, M_{n-1}, M_n$) overlap each other. In this instance, when a high potential is applied to the drain, electrons and holes enter the depletion region. That is, the electrons enter toward the drain through tunneling by the high potential at the drain, which signifies a leakage current to the body. The negative turn-off voltage ($V_{NEG}$) increases by the leakage current. In other words, when the RF switch 1100 is turned off and the voltage at the respective ends of the RF switch 1100 increases, the negative turn-off voltage ($V_{NEG}$) supplied to the RF switch 1100 from the voltage generator 1300 becomes higher than the predetermined value. The RF switch protective circuit 1200 to be described detects the negative turn-off voltage ($V_{NEG}$), and it may indirectly detect applying of a high voltage at the respective ends of the RF switch 1100 through the detected turn-off voltage ($V_{NEG}$). That is, the RF switch protective circuit 1200 performs a protection operation according to the detected turn-off voltage ($V_{NEG}$).

The RF switch protective circuit 1200 receives the turn-off voltage ($V_{NEG}$) supplied by the voltage generator 1300, detects the received turn-off voltage ($V_{NEG}$), and changes an impedance value based on the detected turn-off voltage ($V_{NEG}$). The RF switch protective circuit 1200 is connected between the port P1 and the ground and protects the RF switch 1100. The RF switch protective circuit 1200 may include an element having an impedance value that is internally changed, and changes the impedance value based on the detected turn-off voltage ($V_{NEG}$). In an example, when the detected turn-off voltage ($V_{NEG}$) increases, the RF switch protective circuit 1200 may lower the internal impedance value to allow the voltage (signal) at the RF switch 1100 to bypass the RF switch 1100. Accordingly, the RF switch protective circuit 1200 may protect the RF switch 1100 from being broken down.

Figure 5:
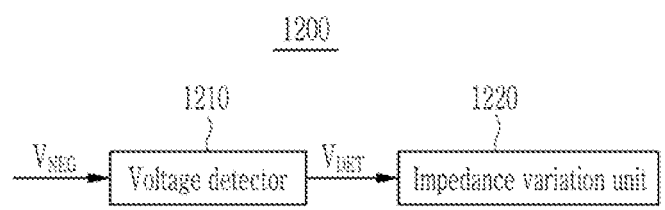
FIG. 5 illustrates a block diagram of an example RF switch protective circuit, in accordance with one or more embodiments.

FIG. 5 illustrates a block diagram of an example RF switch protective circuit 1200, in accordance with one or more embodiments.

As illustrated in FIG. 5, the RF switch protective circuit 1200 may include a voltage detector 1210 and an impedance variation unit 1220.

The voltage detector 1210 may detect the turn-off voltage ($V_{NEG}$) supplied to the RF switch 1100 from the voltage generator 1300. To turn off the RF switch 1100, the voltage generator 1300 supplies the negative turn-off voltage ($V_{NEG}$) to the gate and the body of the RF switch 1100. The voltage detector 1210 may receive the negative turn-off voltage ($V_{NEG}$) applied to at least one terminal of the gate and the body of the RF switch 1100 and may detect it. A method for the voltage detector 1210 to detect the negative turn-off voltage ($V_{NEG}$) will be described in detail in a latter portion of the present specification. The voltage detector 1210 may detect the negative turn-off voltage ($V_{NEG}$), and output a detection voltage ($V_{DET}$) corresponding to the detected value to the impedance variation unit 1220.

The impedance variation unit 1220 receives a detection voltage ($V_{DET}$) from the voltage detector 1210, and changes an internal impedance value according to the detection voltage ($V_{DET}$). The impedance variation unit 1220 lowers the internal impedance value when the detection voltage ($V_{DET}$) increases (or rises). The impedance lowered in this way may be applied to the respective ends of the RF switch 1100, so the voltage (signal) at the respective ends of the RF switch 1100 may be bypassed through the RF switch protective circuit 1200 with a low impedance value.

Figure 6:
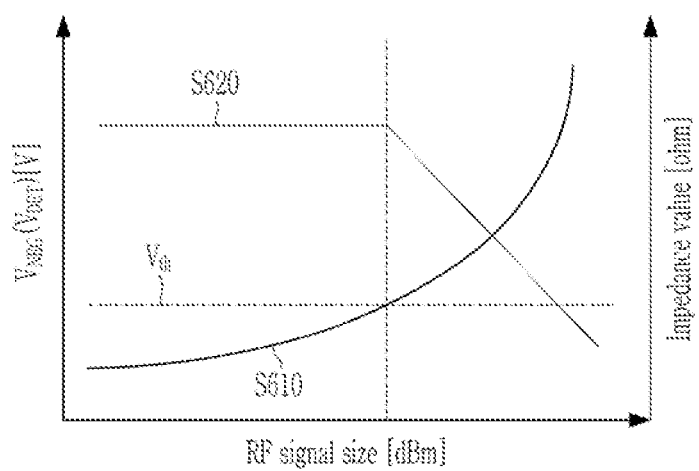
FIG. 6 illustrates a conceptual graph of an operation of an RF switch system, in accordance with one or more embodiments.

FIG. 6 illustrates a conceptual graph of an operation of an example RF switch system 1000, in accordance with one or more embodiments.

Referring to FIG. 6, a horizontal axis represents an RF signal size at respective ends of the RF switch 1100. The RF signal size may increase by internal design factors or external environment factors (e.g., a rise of the VSWR). S610 indicates a turn-off voltage ($V_{NEG}$) (the voltage applied to the gate or the body when the RF switch 1100 is turned off) according to the RF signal size. S620 indicates an impedance value of the RF switch protective circuit 1200 according to the RF signal size.

Referring to S610 of FIG. 6, when the RF signal size increases, the turn-off voltage ($V_{NEG}$) of the RF switch 1100 increases. A rise of the turn-off voltage ($V_{NEG}$) of the RF switch 1100 may be generated by the gate induced drain leakage (GIDL). When the turn-off voltage ($V_{NEG}$) of the RF switch 1100 rises to be equal to, or greater than, a predetermined threshold value (Vth), the RF switch protective circuit 1200 decreases the internal impedance value. When the impedance value of the RF switch protective circuit 1200 decreases, a current $l_2$ flowing through the RF switch protective circuit 1200 from the port P1 decreases. When the impedance value of the RF switch protective circuit 1200 decreases, a current $l_1$ flowing through the RF switch 1100 from the port P1 decreases. Accordingly, RF power applied to the turned-off RF switch 1100 may be reduced, and a breakdown of the RF switch 1100 may be prevented.

Various examples of the RF switch protective circuit 1200 will now be described with reference to FIG. 7A to FIG. 7D

Figure 7A:
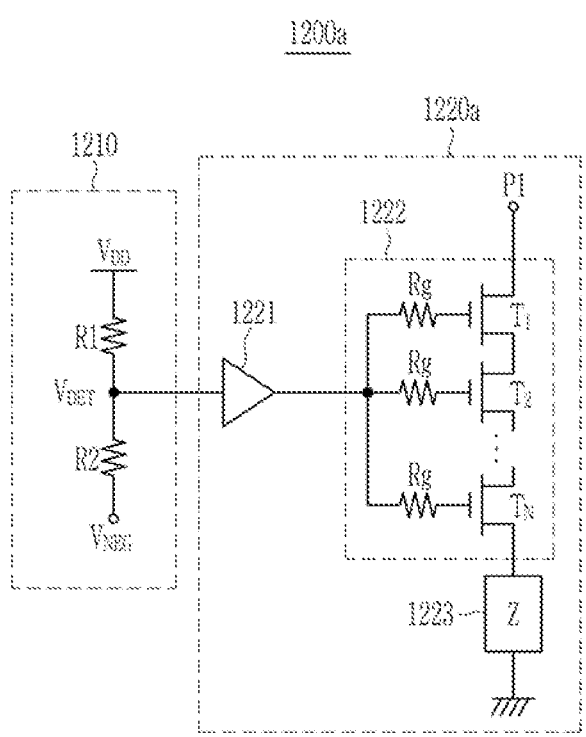
FIG. 7A to FIG. 7D illustrate an example RF switch protective circuit, in accordance with one or more embodiments.

FIG. 7A illustrates an example RF switch protective circuit 1200a, in accordance with one or more embodiments.

As illustrated in FIG. 7A, the RF switch protective circuit 1200a includes a voltage detector 1210 and an impedance variation unit 1220a.

The voltage detector 1210 may include a plurality of resistors R1 and R2. A first end of the resistor R1 is connected to a power voltage VDD, and a first end of the resistor R2 is connected to a second end of the resistor R1. A second end of the resistor R2 is connected to the turn-off voltage ($V_{NEG}$) of the RF switch 1100. Specifically, the turn-off voltage ($V_{NEG}$) of the RF switch 1100 is applied to the second end of the resistor R2. The resistor R1 and the resistor R2 are coupled in series to each other to form a resistor column, and a voltage at a node of the resistor R1 and the resistor R2 corresponds to the detection voltage ($V_{DET}$). FIG. 7A illustrates the voltage detector 1210 configured with two resistors R1 and R2, and the voltage detector 1210 may be configured with more resistor columns.

The detection voltage ($V_{DET}$) satisfies Equation 1 below.

$$V_{DET} = \frac{R2}{R1+R2} * (V_{DD} - V_{NEG}) \quad \text{Equation 1}$$

In Equation 1, resistance of the resistors R1 and R2 and the power voltage VDD may be fixed values, so the detection voltage ($V_{DET}$) changes according to the turn-off voltage ($V_{NEG}$) of the RF switch 1100. That is, the voltage detector 1210 may generate a detection voltage ($V_{DET}$) that is changed by the turn-off voltage ($V_{NEG}$) of the RF switch 1100.

The impedance variation unit 1220a may include a buffer 1221, a transistor unit 1222, and an impedance component 1223.

The buffer 1221 receives the detection voltage ($V_{DET}$), and drives the transistor unit 1222 based on the detection voltage ($V_{DET}$).

The transistor unit 1222 may include at least one transistor ($T_1$ to $T_N$) coupled in series to each other. FIG. 7A illustrates the transistor unit 1222 including a plurality of transistors ($T_1$ to $T_N$). However, in an example, the transistor unit 1222 may include a single transistor $T_1$.

A plurality of transistors ($T_1$ to $T_N$) may respectively receive an output of the buffer 1221 through a plurality of gate resistors (Rg). A drain of the transistor $T_1$ may be connected to the port P1, a drain of the transistor $T_2$ may be connected to a source of the transistor $T_1$, and a drain of the transistor ($T_n$) may be connected to a source of the transistor $T_{n-1}$. A source of the transistor ($T_n$) is connected to the impedance component 1223. The plurality of transistors ($T_1$ to $T_N$) may be, as non-limiting examples, field effect transistors (FET), metal oxide semiconductor field effect transistors (MOSFET), or bipolar junction transistors (BJT).

The impedance component 1223 is connected between the transistor unit 1222 and the ground. That is, the impedance component 1223 may be connected between the source of the transistor (Tn) and the ground. The impedance component 1223 may include, as non-limiting examples, at least one of a resistor, a capacitor, and an inductor, and provides a predetermined impedance value according to a frequency of the RF signal.

When the detection voltage ($V_{DET}$) increases (rises), the buffer 1221 drives (turns on) the transistor unit 1222 with a high voltage. When the transistor unit 1222 is turned on, the total impedance value ($Z_{SUM\_ON}$) of the impedance variation unit 1220a corresponds to the sum of the impedance value corresponding to the turn-on of the transistor unit 1222 and the impedance value of the impedance component 1223. When the impedance value corresponding to the turn-on of the transistor unit 1222 is given as '$R_{ON}$' for convenience's sake, the total impedance value ($Z_{SUM\_ON}$) of the impedance variation unit 1220a is expressed as Equation 2 below.

$$Z_{SUM\_ON} = R_{ON} + Z \quad \text{Equation 2:}$$

In Equation 2, Z represents an impedance value of the impedance component 1223.

When the detection voltage ($V_{DET}$) falls (or is reduced), the buffer 1221 may not turn on the transistor unit 1222. When the transistor unit 1222 is turned off, the total impedance value ($Z_{SUM\_OFF}$) of the impedance variation unit 1220a may correspond to the sum of the impedance value corresponding to the turn-off of the transistor unit 1222 and the impedance value of the impedance component 1223. When the impedance value corresponding to the turn-off of the transistor unit 1222 is given as '$Z_{Coff}$', the total impedance value ($Z_{SUM\_OFF}$) of the impedance variation unit 1220a is expressed as Equation 3 below.

$$Z_{SUM\_OFF} = Z_{Coff} + Z \quad \text{Equation 3:}$$

The impedance value ($R_{ON}$) corresponding to the turn-on of the transistor unit 1222 has a value that is substantially lower than the impedance value ($Z_{Coff}$) corresponding to the turn-off of the transistor unit 1222. Accordingly, the impedance variation unit 1220a may supply a low impedance value between the port P1 and the ground when the turn-off voltage ($V_{NEG}$) of the RF switch 1100 increases (or rises).

Figure 7B:
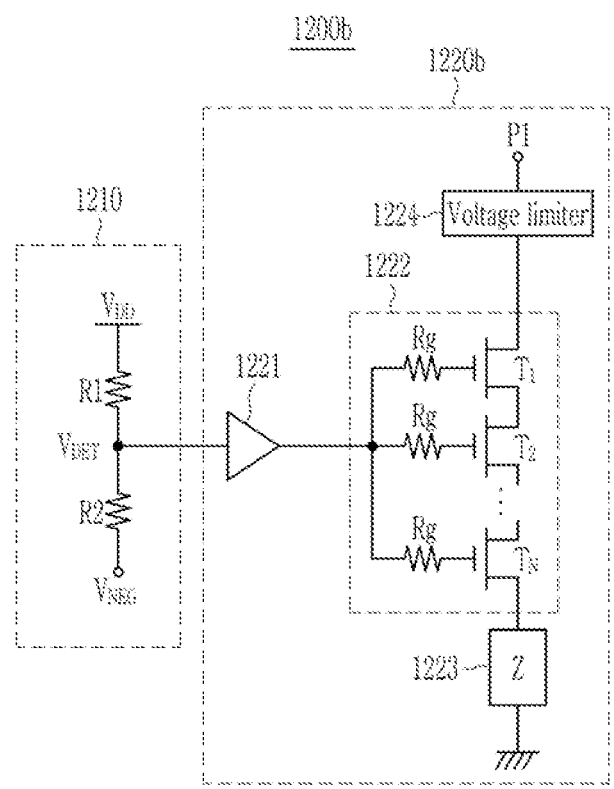

FIG. 7B illustrates an example RF switch protective circuit 1200b, in accordance with one or more embodiments.

Referring to FIG. 7B, the RF switch protective circuit 1200b may include a voltage detector 1210 and an impedance variation unit 1220b.

Referring to FIG. 7B and FIG. 7A, the impedance variation unit 1220b corresponds to the impedance variation unit 1220a except that the impedance variation unit 1220b may further include a voltage limiter 1224.

The voltage limiter 1224 is connected between the port P1 and the transistor unit 1222. The voltage limiter 1224 may be implemented by at least one diode. In an example, the voltage limiter 1224 may include a plurality of diodes coupled in series with each other. Further, the RF signal may be an AC signal, accordingly, the voltage limiter 1224 may include diodes connected back to back. A detailed configuration of the voltage limiter 1224 will be described with reference to FIG. 8. When a voltage that is equal to or greater than the threshold voltage is applied at the respective ends of the voltage limiter 1224, the voltage limiter 1224 is turned on, and a predetermined limiter voltage is applied at the respective ends. That is, the voltage limiter 1224 has a low impedance value at the voltage that is equal to or greater than the threshold voltage. The voltage limiter 1224 is turned off at the voltage that is less than the threshold voltage and has a high impedance value.

As described with reference to FIG. 7A, when the detection voltage ($V_{DET}$) increases (or rises), the transistor unit 1222 is turned on, and the transistor unit 1222 has a low impedance value. When the impedance value of the transistor unit 1222 is reduced, a voltage that is equal to or greater than the threshold voltage is applied to the voltage limiter 1224, and the voltage limiter 1224 is accordingly turned on. The voltage limiter 1224 is turned on, so the voltage limiter 1224 has a low impedance value. That is, when the detection voltage ($V_{DET}$) increases (or rises), the voltage limiter 1224 and the transistor unit 1222 have low impedance values.

As described with reference to FIG. 7A, when the detection voltage ($V_{DET}$) is low, the transistor unit 1222 is turned off, and the transistor unit 1222 has a high impedance value. When the impedance value of the transistor unit 1222 increases, a voltage that is less than a threshold voltage is applied to the voltage limiter 1224, and the voltage limiter 1224 is accordingly turned off. The voltage limiter 1224 is turned off, so the voltage limiter 1224 has a high impedance value. That is, when the detection voltage ($V_{DET}$) is reduced (or lowered), the voltage limiter 1224 and the transistor unit 1222 have high impedance values.

The impedance variation unit 1220b according to an example as described above may supply a low impedance value between the port P1 and the ground when the turn-off voltage ($V_{NEG}$) of the RF switch 1100 increases (or rises).

Figure 7C:
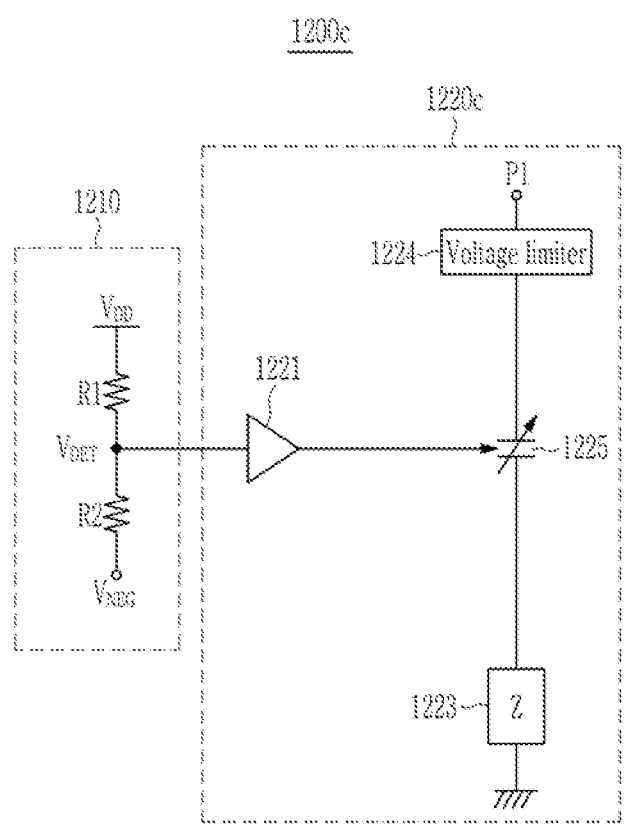

FIG. 7C illustrates an example RF switch protective circuit 1200c, in accordance with one or more embodiments.

Referring to FIG. 7C, the RF switch protective circuit 1200c may include a voltage detector 1210 and an impedance variation unit 1220c.

Referring to FIG. 7C and FIG. 7B, the impedance variation unit 1220c corresponds to the impedance variation unit 1220b except that the transistor unit 1222 of the impedance variation unit 1220b is replaced with a variable capacitor 1225.

A first end of the variable capacitor 1225 is connected to the voltage limiter 1224, and a second end of the variable capacitor 1225 is connected to the impedance component 1223. That is, the variable capacitor 1225 is connected between the voltage limiter 1224 and the impedance component 1223. A control terminal of the variable capacitor 1225 is connected to an output end of the buffer 1221. A capacitance of the variable capacitor 1225 may change according to the voltage input to the control terminal. That is, when the voltage input to the control terminal increases, the capacitance of the variable capacitor 1225 is increased, and the impedance value accordingly decreases. The variable capacitor 1225 may be realized with a varactor, which may control the capacitance of the variable capacitor 1225.

When the detection voltage ($V_{DET}$) increases, an output voltage of the buffer 1221 increases. The output voltage of the buffer 1221 is input to a control terminal of the variable capacitor 1225, and accordingly, when the detection voltage ($V_{DET}$) increases, the impedance value of the variable capacitor 1225 decreases. When the impedance value of the variable capacitor 1225 is decreases, a voltage that is equal to or greater than the threshold voltage is applied to the voltage limiter 1224, and the voltage limiter 1224 is turned on. As the voltage limiter 1224 is turned on, the voltage limiter 1224 may have a low impedance value. That is, when the detection voltage ($V_{DET}$) increases, the voltage limiter 1224 and the variable capacitor 1225 may have low impedance values.

When the detection voltage ($V_{DET}$) decreases, the output voltage of the buffer 1221 decreases. The output voltage of the buffer 1221 is input to the control terminal of the variable capacitor 1225, and accordingly, when the detection voltage ($V_{DET}$) decreases, the impedance value of the variable capacitor 1225 increases. When the impedance value of the variable capacitor 1225 increases, a voltage that is less than the threshold voltage is applied to the voltage limiter 1224, and the voltage limiter 1224 is then turned off. As the voltage limiter 1224 is turned off, the voltage limiter 1224 has a high impedance value. That is, when the detection voltage ($V_{DET}$) decreases (or falls), the voltage limiter 1224 and the variable capacitor 1225 have high impedance values.

When the turn-off voltage ($V_{NEG}$) of the RF switch 1100 increases (or rises), the impedance variation unit 1220c, according to an example, may supply a low impedance value to the port P1 and the ground.

Figure 7D:
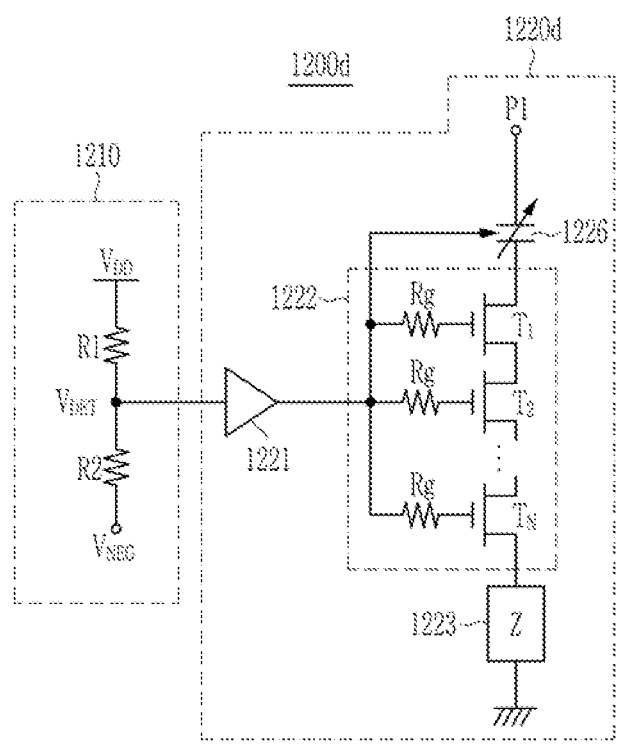

FIG. 7D illustrates an example RF switch protective circuit 1200d, in accordance with one or more embodiments.

Referring to FIG. 7D, the RF switch protective circuit 1200d may include a voltage detector 1210 and an impedance variation unit 1220d.

Referring to FIG. 7D and FIG. 7B, the impedance variation unit 1220d corresponds to the impedance variation unit 1220b except that the voltage limiter 1224 of the impedance variation unit 1220b is replaced with the variable capacitor 1226.

A first end of the variable capacitor 1226 is connected to the port P1, and a second end of the variable capacitor 1226 is connected to the transistor unit 1222. That is, the variable capacitor 1226 is connected between the port P1 and the transistor unit 1222. A control terminal of the variable capacitor 1226 is connected to the output end of the buffer 1221. The capacitance of the variable capacitor 1226 changes according to the voltage input to the control terminal. That is, when the voltage input to the control terminal increases, the capacitance of the variable capacitor 1226 increases, and the impedance value accordingly decreases.

As described with reference to FIG. 7A and FIG. 7B, when the detection voltage ($V_{DET}$) increases (or rises), the transistor unit 1222 is turned on, so the transistor unit 1222 has a low impedance value. When the detection voltage ($V_{DET}$) increases (or rises), the impedance value of the variable capacitor 1226 decreases. That is, when the detection voltage ($V_{DET}$) increases (or rises), the transistor unit 1222 and the variable capacitor 1226 have low impedance values.

As described with reference to FIG. 7A and FIG. 7B, when the detection voltage ($V_{DET}$) decreases (or falls), the transistor unit 1222 is turned off, so the transistor unit 1222 has a high impedance value. When the detection voltage ($V_{DET}$) decreases, the impedance value of the variable capacitor 1226 increases. That is, when the detection voltage ($V_{DET}$) decreases (or falls), the transistor unit 1222 and the variable capacitor 1226 have high impedance values.

The impedance variation unit 1220d, in accordance with one or more embodiments, may supply a low impedance value between the predetermined port P1 and the ground when the turn-off voltage ($V_{NEG}$) of the RF switch 1100 increases (or rises).

Figure 8:
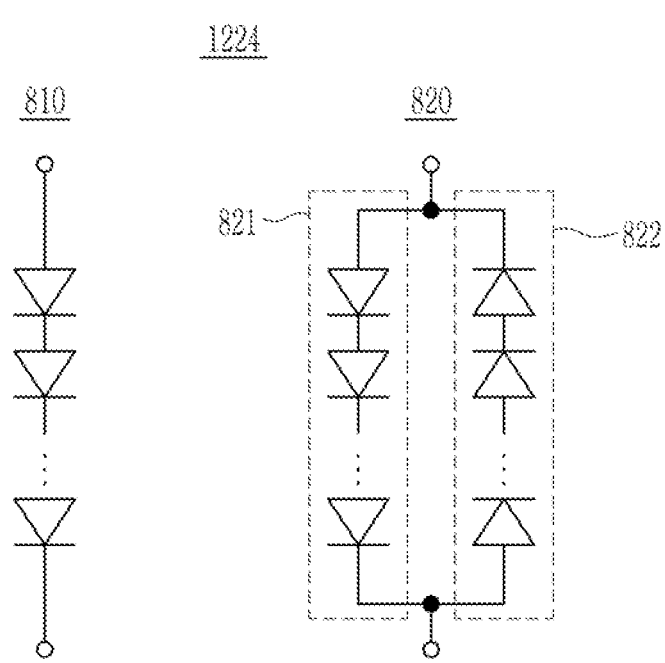
FIG. 8 shows a voltage limiter according to an exemplary embodiment.

FIG. 8 illustrates an example voltage limiter 1224, in accordance with one or more embodiments. That is, FIG. 8 illustrates the example voltage limiter 1224 described with reference to FIG. 7B and FIG. 7C.

Referring to element 810 of FIG. 8, the voltage limiter 1224 may include at least one diode. Referring to element 810 of FIG. 8, the voltage limiter 1224 may be configured with a plurality of diodes coupled in series with each other, and the voltage limiter 1224 may be implemented with a single diode.

Referring to element 820 of FIG. 8, the voltage limiter 1224 may include diodes 821 and 822 connected back to back. The diode 821 may include a plurality of diodes coupled in series with each other. The diode 822 may include a plurality of diodes that are provided in an opposite direction to the diode 821 and are coupled in series with each other. That is, the diode 821 and the diode 822 may be connected to each other back to back. When the RF signal has a positive (+) value, the diode 821 functions as a voltage limiter, and when the RF signal has a negative (−) value, the diode 822 functions as a voltage limiter. The diode 821 and the diode 821 are shown to respectively include a plurality of diodes, but may respectively include at least one diode.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radio frequency (RF) switch system comprising:
a first RF switch connected between a port configured to receive an RF signal and a ground; and
an RF switch protective circuit configured to, based on a turn-off voltage applied to the first RF switch to turn the first RF switch off, apply an impedance, having an impedance value that varies according to the turn-off voltage, to the port to cause the RF signal to bypass the first RF switch.

2. The RF switch system of claim 1, wherein the impedance value has a lower value as the turn eff voltage increases.

3. The RF switch system of claim 1, wherein the impedance value decreases in response to the turn-off voltage increasing to be equal to or exceed a threshold voltage.

4. The RF switch system of claim 1, wherein the first RF switch comprises at least one transistor, and
the turn-off voltage is applied to either one or both of a gate of the at least one transistor and a body of the at least one transistor.

5. The RF switch system of claim 4, further comprising a voltage generator configured to generate the turn-off voltage and apply the generated turn-off voltage to the either one or both of the gate of the at least one transistor and the body of the at least one transistor,
wherein the turn-off voltage is a negative voltage.

6. The RF switch system of claim 1, further comprising a second RF switch connected between the port and an antenna, and configured to turn on and off to switch between transmitting the RF signal to the antenna and not transmitting the RF signal to the antenna,
wherein the second RF switch is configured to turn off when the first RF switch is turned on, and turn on when the first RF switch is turned off.

7. The RF switch system of claim 1, wherein the first RF switch comprises an RF switch,
a first end of the RF switch is connected to the port,
an impedance component is connected between a second end of the RF switch and the ground, and
the RF switch is configured to turn on to connect the impedance component to the port to tune an antenna to one frequency band, and turn off to disconnect the impedance component from the port to tune the antenna to another frequency band.

8. The RF switch system of claim 1, wherein the first RF switch comprises a second RF switch and a third RF switch,
a first end of the second RF switch is connected to the port,
an impedance component is connected between a second end of the second RF switch and the ground,
the third RF switch is connected between the second end of the second RF switch and the ground, and
the turn-off voltage is applied to the second RF switch to turn the second RF switch off while the third RF switch is turned on, and is applied to the third RF switch to turn the third RF switch off while the second RF switch is turned on.

9. The RF switch system of claim 1, wherein the RF switch protective circuit comprises:
a voltage detector configured to receive the turn-off voltage, and generate a detection voltage corresponding to the turn-off voltage; and
an impedance variation unit configured to apply the impedance value that varies according to the detection voltage to the port.

10. The RF switch system of claim 9, wherein the impedance variation unit comprises:
a voltage limiter comprising a first end connected to the port;
a variable capacitor comprising a first end connected to a second end of the voltage limiter; and
an impedance component connected between a second end of the variable capacitor and the ground,
an impedance value of the voltage limiter varies according to the detection voltage, and
an impedance value of the variable capacitor varies according to the detection voltage.

11. The RF switch system of claim 9, wherein the impedance variation unit comprises:
at least one transistor comprising a first end connected to the port; and
an impedance component connected between a second end of the at least one transistor and the ground, and
an impedance value of the at least one transistor varies according to the detection voltage.

12. The RF switch system of claim 11, wherein the impedance variation unit further comprises a voltage limiter connected between the port and the first end of the at least one transistor, and
an impedance value of the voltage limiter varies according to the detection voltage.

13. The RF switch system of claim 11, wherein the impedance variation unit further comprises a variable capacitor connected between the port and the first end of the at least one transistor, and
an impedance value of the variable capacitor varies according to the detection voltage.

14. A radio frequency (RF) switch protective circuit configured to protect an RF switch connected between a port configured to receive an RF signal and a ground, the RF switch protective circuit comprising:
a voltage detector configured to detect a turn-off voltage applied to the RF switch to turn off the RF switch; and
an impedance variation unit configured to apply an impedance, having an impedance value that varies according to the detected turn-off voltage, between the port and the ground to cause the RF signal to bypass the RF switch.

15. The RF switch protective circuit of claim 14, wherein the impedance value decreases in response to the detected turn-off voltage increasing to be equal to or exceed a threshold voltage.

16. The RF switch protective circuit of claim 15, wherein the RF switch comprises a plurality of transistors,
the turn-off voltage is applied to respective bodies of the plurality of transistors,
the turn-off voltage is set at a predetermined negative voltage, and
the detected turn-off voltage increases to be higher than the predetermined negative voltage as a voltage across the RF switch increases.

17. The RF switch protective circuit of claim 16, wherein the impedance variation unit comprises:
a variable capacitor having an impedance value that varies according to the detected turn-off voltage; and
a voltage limiter comprising at least one diode and having an impedance value that varies according to the detected turn-off voltage.

18. The RF switch protective circuit of claim 16, wherein the impedance variation unit comprises a transistor unit comprising at least one transistor and having an impedance value that varies according to the detected turn-off voltage.

19. The RF switch protective circuit of claim 18, wherein the impedance variation unit further comprises a voltage limiter comprising at least one diode and having an impedance value that varies according to the detected turn-off voltage.

20. The RF switch protective circuit of claim 18, wherein the impedance variation unit further comprises a variable capacitor having an impedance value that varies according to the detected turn-off voltage.

21. A method of protecting a radio frequency (RF) switch connected between a port configured to receive an RF signal and a ground, the method comprising:
detecting a turn-off voltage applied to the RF switch to turn off the RF switch;
applying a first impedance value between the port and the ground in response to the detected turn-off voltage being less than a threshold voltage; and
applying a second impedance value lower than the first impedance value between the port and the ground in response to the detected turn-off voltage being equal to or exceeding the threshold voltage.

22. The method of claim 21, wherein the turn-off voltage is a negative voltage, and
the detected turn-off voltage increases as a voltage across the RF switch increases.

\* \* \* \* \*